United States Patent [19]

Hope et al.

[11] Patent Number: 4,657,378

[45] Date of Patent: Apr. 14, 1987

[54] COLOR PRINTING CONTROL SYSTEM AND METHOD

[75] Inventors: Henry F. Hope; Stephen F. Hope, both of Huntingdon Valley, Pa.; David Fidelman, Roslyn Heights, N.Y.

[73] Assignee: Hope Industries, Inc., Willow Grove, Pa.

[21] Appl. No.: 739,187

[22] Filed: May 30, 1985

Related U.S. Application Data

[63] Continuation of Ser. No. 477,824, Mar. 22, 1983, Pat. No. 4,526,462.

[51] Int. Cl.$^4$ .................. G03B 27/73; G03B 27/80
[52] U.S. Cl. ............................... 355/38; 355/77; 250/214 P; 250/214 C
[58] Field of Search ............................. 355/38, 68, 77; 250/214 P, 214 B, 214 C

[56] References Cited

U.S. PATENT DOCUMENTS

| | | | |
|---|---|---|---|
| 3,582,325 | 6/1971 | Paulus | 355/77 |
| 4,061,925 | 12/1977 | van der Gaag et al. | 250/214 B X |
| 4,125,326 | 11/1978 | Baert | 355/74 |
| 4,128,760 | 5/1978 | Del Signore, II | 250/214 B |
| 4,140,391 | 2/1979 | Laciak et al. | 355/38 |
| 4,149,799 | 4/1979 | Poné, Jr. et al. | 355/38 |
| 4,168,120 | 9/1979 | Freier et al. | 355/38 |
| 4,168,121 | 9/1979 | Freier et al. | 355/38 |
| 4,172,659 | 10/1979 | Laska | 355/68 |
| 4,174,173 | 11/1979 | Poné, Jr. | 355/38 |
| 4,175,853 | 11/1979 | Harvey | 355/38 |
| 4,236,818 | 12/1980 | Fauchier | 355/77 |
| 4,270,861 | 6/1981 | Beckman | 355/38 |
| 4,286,868 | 9/1981 | Laska | 355/68 |
| 4,339,517 | 7/1982 | Akimoto | 355/77 |
| 4,371,259 | 2/1983 | Howitt | 355/38 |

Primary Examiner—L. T. Hix
Assistant Examiner—D. Rutledge
Attorney, Agent, or Firm—Ratner & Prestia

[57] ABSTRACT

A color printing control system for making prints from negatives having a color printer and a microprocessor. The output of photocells which read color negatives is applied to the microprocessor enabling it to calculate print time signals. These signals are applied, for example, to paddles and move them into the light path to terminate light exposure. A print test probe reads the density of the prints and is coupled to the microprocessor and forms a feedback loop which allows the microprocessor to adjust its internal values. In this manner, color balancing is performed and prints made from over and underexposed negatives have the same density as properly exposed negatives, without knowledge of paper characteristics and without operator setup calculations. This is achieved using the difference in density between a reference print and prints made by the system as a basis for calculating correction factors which are applied to such values as slope to cause subsequent print time signals to result in correct density. The system also corrects color predominance in negatives where the conventional integration to gray method would print incorrectly. In cases where color analysis indicates the possibility of exposure under tungsten or fluorescent light an operator prompt is provided allowing the operator to enable an appropriate correction.

4 Claims, 8 Drawing Figures

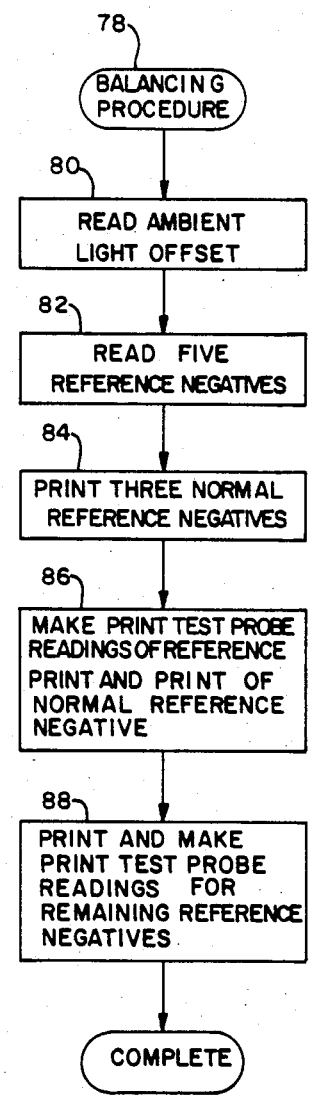
FIG.2A GENERAL BALANCING PROCEDURE

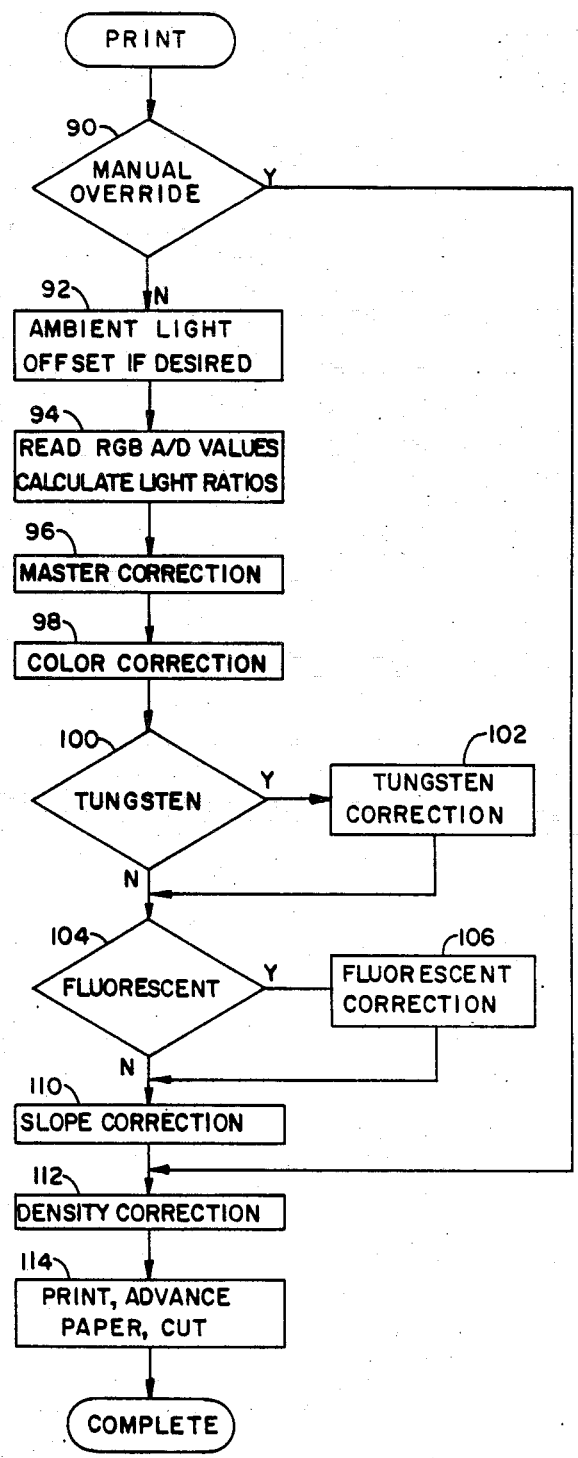
FIG. 2B  GENERAL PRINT CYCLE

COLOR PRINTING CONTROL SYSTEM AND METHOD

This application is a continuation of application Ser. No. 477,824, now U.S. Pat. No. 4,526,462, filed Mar. 22, 1983.

BACKGROUND OF THE INVENTION

A. Field of the Invention

This invention relates to the field of art of systems which control color printing.

B. Background Art

Color printing control systems are known in the art. However, prior systems have been limited in that they have usually required hand calculations by an operator of the readings of the density information on the prints, or they have required complicated printing procedures such as ring-arounds, seven-button density series, slope series, etc. The prior art has been unable to achieve a fully automated system with a closed feedback loop that operated with efficiency but without a great deal of complexity. Prior computer controlled systems have been extremely complicated and difficult to set up and balance. On the other hand, noncomputer controlled systems have left much to be desired in that they have not provided adequate flexibility and simplicity in setup which are necessary for today's multiplicity of film types, print size, etc. A further objection of prior color printing control systems has been that they have generally not provided adequate first print results or true color balance for negatives made under tungsten or fluorescent light conditions.

SUMMARY OF THE INVENTION

A color printing control system for making color prints from color negatives which comprises a color printer, microprocessor and photocells for reading the color negative. A plurality of paddles moves subtractive filters and shutters into the light path in response to print time signals from the computer. The printing times of these signals are computed from the photocell readings of the red, green and blue light transmitted through the negative. These calculations are based upon values stored in the computer memory which have been determined during an automated setup procedure. A print test probe coupled to the microprocessor reads the density values of a print made from a reference negative, and those of a correctly exposed print of the same negative. If there is any difference, the microprocessor calculates from these readings a set of correction factors which then permit it to make correct prints from this reference negative, and therefore from any other negative.

Further, the microprocessor determines the proper relationship between light transmission through the negative and proper print time signals for under and overexposed negatives to compensate for the non-linear relationship which exists (known as "slope"). This is done by making prints of an over and an underexposed negative, and comparing these prints with the correctly exposed prints. The microprocessor uses the differences to calculate a new slope characteristic which will produce proper prints without data on the characteristics of paper used. The procedure is performed using one set of moderately over and underexposed reference negatives, and again with a set of extremely over and underexposed negatives. Thus a four-segment slope characteristic is derived which provides proper correction for both moderately and extremely incorrect negative exposures. No operator setup calculations are required.

There is still further provided, a method of printing negatives that have a color predominance, where the conventional "integration-to-gray" method would print incorrectly. The color content of the negative is analyzed, and when a color predominance is detected the printing color balance is modified accordingly. In cases where the color analysis indicates the possibility of an exposure under tungsten light, for which normal outdoor film is not properly balanced, an operator prompt is shown so that the operator can decide whether the picture seems to be one taken under tungsten illumination. If so, a tungsten color correction is added to give accurate color balance in the print. A similar procedure is followed for fluorescent light illumination.

BRIEF DESCRIPTION OF THE DRAWINGS

FIG. 2A is a flowchart of the general balancing procedure used in the invention of FIG. 1A.

FIG. 2B is a flowchart of the general print cycle performed by the invention of FIG. 1A.

GENERAL DESCRIPTION OF SYSTEM 10

Figure 1A:
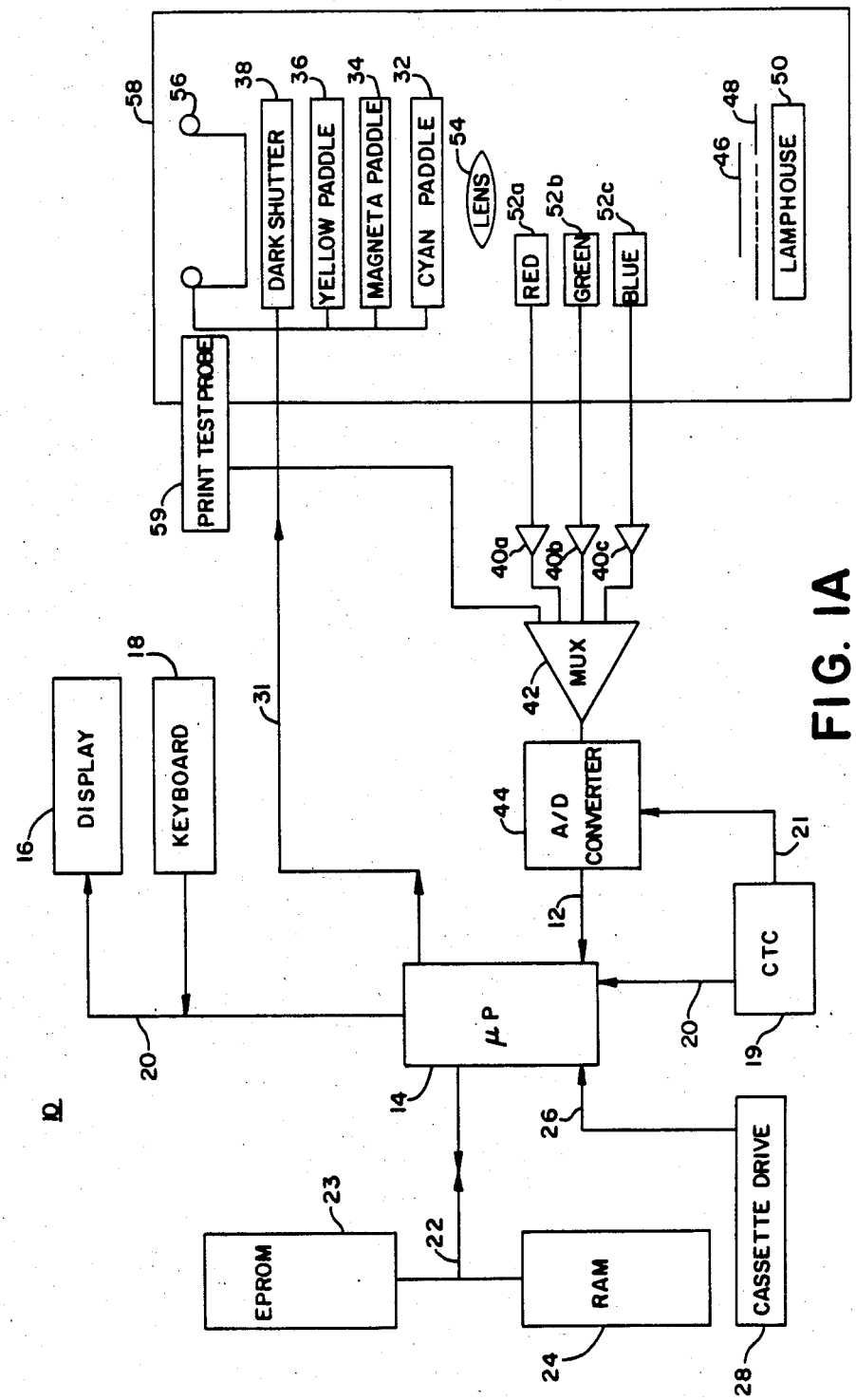
FIG. 1A is a block diagram of a color printing control system in accordance with the invention described.

A block diagram of a preferred embodiment of a color printer system 10 is shown in FIG. 1A. Color printer system 10 includes a conventional color printer 58, a microprocessor 14, eraseable programmable read only memory (EPROM) 23, a random access memory (RAM) 24 interconnected by a means of bus 22, an A/D converter 44, a multiplexer 42 operational amplifiers 40a–c, and a print test probe 59. Test probe 59 reads color prints and transmits density readings directly to the control circuitry through multiplexer 42. Time controller chip (CTC) 19 provides microprocessor 14 with real time interrupts and cassette drive 28 is used to store data base information. This data base information passes between cassette drive 28 and RAM 24 where it is stored when being used, by means of bus 26, microprocessor 14 and bus 22. Display 16 and keyboard 18 are connected to microprocessor 14 by means of bus 20. Using display 16 and keyboard 18 the operator may communicate with color printer system 10.

Within color printer 58, negative 46, in a negative mask 48, is placed above lamphouse 50. Lamphouse 50 contains an illumination source and the illuminated negative is focused through lens 54 onto the paper which is to be exposed. Paper transport 56 controls the movement of this paper. The light which is transmitted through negative 46 strikes photocells 52a–c which determine how much red, green and blue light respectively is transmitted through negative 46.

The outputs from photocells 52a–c are amplified by means of operational amplifiers 40a–c. The outputs of amplifiers 40a–c and densitometer 59 are multiplexed by multiplexer 42 and applied to A/D converter 44. A/D converter 44 supplies microprocessor 14 with digital information of the output of photocells 52a–c and probe 59 by means of bus 12.

Cyan paddle 32 includes a cyan filter which blocks cyan light while allowing other frequencies of light to pass. This cyan filter may be moved between lamp housing 50 and the paper which is being exposed thereby terminating cyan exposure. Similarly, magenta paddle 34 and yellow paddle 36 may be used to terminate magenta exposure and yellow exposure respectively. Dark shutter 38 is used to completely block any light from striking the paper. EPROM 23 and RAM 24 contain algorithms and data which allow microprocessor 14 to make calculations based upon the output of photocells 52a–c and to make determinations as to when to activate paddles 32, 34, 36 dark shutter 38 and paper transport 56. Microprocessor 14 exercises control over these devices by means of bus 31. Bus 31 includes conventional address decoders.

GENERAL DESCRIPTION OF COLOR BALANCING PROCEDURE

Figure 1B:
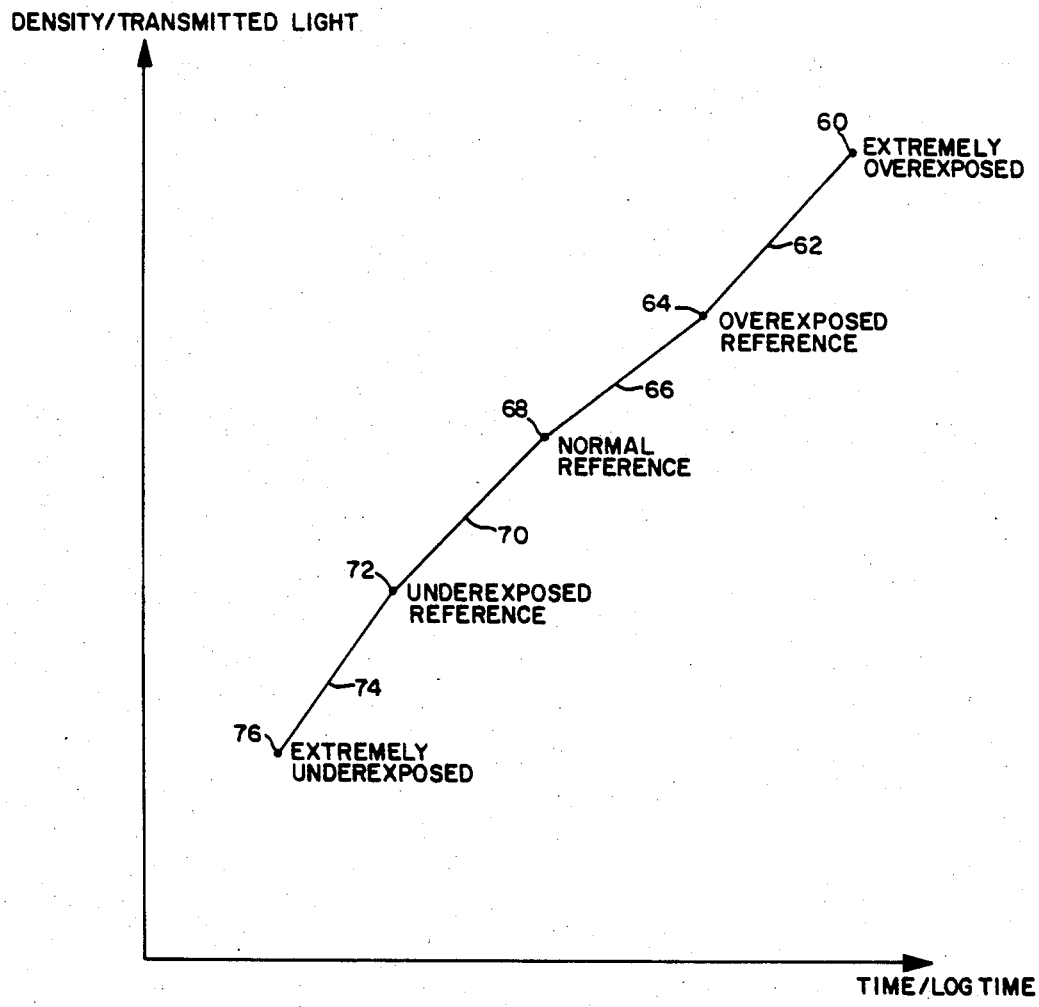
FIG. 1B is a chart of a four segment time versus density slop curve.

In the color balancing procedure shown in FIG. 2A, color printer system 10 adjusts the print times which will be used to produce color prints from a standard reference negative. The objective is to produce prints with the same red, green and blue densities as a standard reference print. Additionally, the procedure adjusts various constants which will be used as correction factors to compensate for the non-linear relationship between density and time when under and overexposed negatives are processed. The operator of color printer system 10 performs the balancing procedure when system 10 is installed and periodically when any of the printing or processing conditions have changed. A major purpose of this balancing procedure is to automatically develop proper slope corrections. A graphic representation of the slope characteristics are shown in FIG. 1B. Each of the three primary colors red, green and blue has its own independent density slope similar to the one shown in FIG. 1B. However, the theory involved in slope correction is identical for each of the three colors and the balancing procedure to be described will be the same for each.

Since a small amount of light from sources external to the printer will leak into color printer 58 and affect the photocell readings, an ambient light offset factor is developed in block 80 by turning the light source in lamphouse 50 of FIG. 1A off while readings are taken using photocells 52a–c. The outputs obtained from operational amplifiers 40a–c are stored in RAM 24 until the print is made. These ambient light values are then subtracted from the photocell readings when prints are made. This procedure thus eliminates the effect of external light which leaks into color printer 58.

In block 82 of FIG. 2A, five standard reference negatives are read using color printer 58 shown in FIG. 1A. The first is a normal reference exposure which is assumed to be a correct exposure. The remaining four negatives represent varying degrees of overexposure and underexposure. They are an overexposed reference negative, an underexposed reference negative, an extremely overexposed negative, and an extremely underexposed negative. Three readings are made for each of the five negatives, one for the amount of the red light detected by the photocell 52a, one for the amount of green light detected by photocell 52b and one for the amount of blue light detected by photocell 52c. Therefore, a total of fifteen A/D readings are taken as a result of the operations performed in block 82. These digital values are related to the quantity of red, green and blue light transmitted through the negatives because they represent the integrated output of the photocells. These fifteen readings are stored in the data base which has been loaded from cassette drive 28 and is stored in RAM 24. These readings are used to establish reference points 60, 64, 68, 72 and 76 of FIG. 1B.

The reading of the normal reference negative is used to establish center reference point 68, the reading of the overexposed reference negative is used to establish reference point 60, the reading of the underexposed reference negative is used to establish reference point 72, and the reading of the extremely underexposed negative is used to establish reference point 76. These reference points are used to determine the slopes of segments 62, 66, 70 and 74 of the four segment slope of FIG. 1B.

Block 84 shows a test used to assure consistent prints. In this test three prints are made of a normal reference negative. These prints are compared visually for consistency. One of them is used for a comparison with a reference print below.

In block 86 two readings using print test probe 59 are made. Print test probe 59 is a light source and light sensing device such as a densitometer. Its output is connected directly to processor 14 by way of multiplexer 42, converter 44 and bus 12. When a print is placed under probe 59 and the amount of red, green and blue light reflected off the print is measured, the operator depresses keys on keyboard 18 to automatically enter that data into RAM 24.

The first print read by probe 59 is a standard normal reference print. The computer attempts to make all production prints look like this reference print. It does this by controlling paddles 32, 34 and 36 to cause the density for each color in the production print to equal the corresponding density in this normal reference print. Having stored in its data base in RAM 24 the amount of red, green and blue reflected from the reference print and detected by the probe of light sensing head 59, the computer is now prepared to accept the readings of head 59 for the second print. This is one of the prints of the normal reference negative which was made in block 84. This print, because it is made from a reference negative assumed to be correct, should generate the same density readings as the reference print. The operator places this second print under test probe 59 and depresses the transmit button. This causes the output of test probe 59 to be directly read by printer system 10.

The corresponding red, green and blue density readings of the two prints are then compared by microprocessor 14. The density difference for each of the three colors is calculated. On the basis of this information, microprocessor 14 calculates new print times as necessary for each of the three colors. The first step in this calculation of the new print time is the development of a multiplication factor which is then applied to the old print time for the appropriate color. This multiplication factor can be expressed as the natural log e raised to the power negative gamma times the delta density where gamma is the standard proportionality constant related to the density characteristics of the printing paper being exposed and the delta density is a proportionality constant related to the density difference between the two prints read by test probe 59. This density difference is related to the density of the reference print minus the difference of the print made from the normal reference negative. EPROM 23 and RAM 24 contain algorithms and data which allow microprocessor 14 to make a first order approximation of this multiplication factor. Due to the feedback made possible by print test probe 59 color printer system 10 does not require knowledge of gamma or other paper characteristics. Any approximations or incorrect assumptions are automatically corrected by iterating blocks 84 and 86.

Therefore, the amount of time before paddles 32, 34 and 36 are moved into the light path changes as necessary in block 86 in order to cause the density of the print made from the normal reference negative to equal the density of the reference print thus causing a proper negative to produce a proper print. This is an iterative learning process for printer system 10. If adjustments of print times were made in block 86 a new print is made from the normal reference negative. Block 86 is then repeated for this new print and the comparison is made between the density readings of the reference print and this new print.

While block 86 causes normal prints to be made from normal negatives, block 88 causes normal prints to be made from underexposed and overexposed negatives. In block 88 prints are made of the five reference negatives described in block 82. These prints are placed under print test probe 59. As each print is placed under probe 59, the operator pushes the transmit button causing the printer to automatically receive and store the density of red, green and blue light in each print. Microprocessor 14 will then recalculate reference points 60, 64, 72 and 76 by applying the multiplication factors developed from the density differences. This process is repeated until the underexposed and overexposed negatives yield normal prints.

Reference points 68 and 64 are then used to determine the slope of segment 66 of FIG. 1B. This is the slope correction which is used when the density of a production negative falls between the normal density and the overexposed density. Using this slope information, a correction characteristic is developed. During a production run, if a density is determined to fall in segment 66, the normal print time will be multiplied by this slope correction factor. Likewise, reference points 68 and 72 are used to determine the slope correction factor for an underexposed negative. If a production negative is determined to have a density in segment 70 a correction factor determined by this slope will be applied to the print times of that negative. Similarly, slope correction factors developed for segment 62 are developed using reference points 64 and 60 and for segment 74 using reference points 72 and 76. By adjusting the reference points, these internal factors or constants of the control algorithm have been automatically adjusted in such a way as to cause normal prints to result from underexposed and overexposed negatives without any intuitive judgement or adjustment by the operator. The objective is, of course, to cause the density of the prints made from all of these negatives to be equal to the density of the reference print.

GENERAL DESCRIPTION OF THE PRINT CYCLE

FIG. 2B shows a flow chart of the print cycle. This cycle is executed when a negative 46 is placed upon negative holder 48 in order to make a print. If there is a manual override, as determined in diamond 90, execution proceeds directly to the density correction of block 112. Otherwise the operator may read the ambient light offset to compensate for changes in ambient light in block 92. This procedure is the same as described in block 80 of FIG. 2A. During normal production prints there will be normal lighting around the machine. This normal lighting may change from day to day or at different times during the day. Thus, the operator may request new offsets to be calculated as often as desired. This request is entered using keyboard 18. The amount of offset calculated will be subtracted from the subsequent photocell readings in order to compensate for the ambient light.

In block 94, the illumination source in lamphousing 50 is activated and the red, green and blue A/D values are read from photocells 52a–c using color printer 58 of FIG. 1A. The linear print times for each color are determined based primarily on these values. The linear print times calculated are the normal reference print times developed in the balancing procedure adjusted by a series of correction factors as necessary. These corrections include light intensity ratios, a master correction, tungsten, fluorescent, and a slope correction.

The light ratios are determined separately for each of the primary colors red, green and blue. The ratio for the red light is the ratio of the A/D output of red photocell 52a taken in block 94 to the A/D reading obtained from photocell 52a when the normal reference negative was read in block 82 of the balancing procedure. This ratio will be multiplied by the normal red print time in order to get the linear component of the print time correction. Similarly, ratios will be developed for green and blue print times.

Block 96 shows the master correction factor. This correction factor takes into account everything in color printer system 10 from the light source through the densitometer reading of the print. It compensates for such things as the aging of the lamp, chemistry changes and dust. The operator may request that a master correction factor be calculated as necessary using keyboard 18. If some negatives are printed correctly and others are not, the operator will perform the balancing procedure in FIG. 2A. However, if there is a systematic problem which appears in all prints the operator will request a calculation of the master correction factor. The result is stored in memory and when block 96 is executed it is multiplied by the linear print times.

In the next step, block 98, color predominance is corrected using integration to gray. In this method the assumption is made that all normally exposed negatives will have the same amount of red, green and blue as the reference negative. Thus, if the difference between the A/D readings of block 94 and those stored for the normal reference negative is above a certain limit, a color predominance is detected. To make the correction for this color predominance the light ratios developed in block 94 are multiplied by the reference print times.

A predominance of yellow may be due to the use of a tungsten filament lightbulb. If such a yellow predominance is detected the printer will inquire of the operator, using display 16, whether a tungsten correction should be performed as represented in diamond 100. By visual inspection of negative 46, the operator can determine whether the predominance detected is due to tungsten or some other factor. If the predominance is due to tungsten, the operator will enter yes, using keyboard 18, and a special tungsten correction will be executed in block 102. This correction is a fixed amount that has been empirically determined to be appropriate for a tungsten filament lightbulb which is added to the adjusted normal reference print time.

Similarly, a predominance of blue/green may be due to fluorescent light. As in the case of the yellow predominance for the tungsten correction, color printer system 10 will inquire of the operator whether a fluorescent correction should be made in diamond 104 when such a predominance of blue is detected. If the operator response is yes the fluorescent correction of block 106 is executed. Again, a fixed empirically determined correction is added to the adjusted normal reference print time.

In block 110 the non-linear portion of the density correction is performed. When the light in lamphouse 50 is transmitted through negative 46 of FIG. 1A, printer system 10 can determine the amount of light transmitted by integrating the output of the photocells 52a–c. If too little light is transmitted by the negative, the paper must be exposed longer. To the first approximation there is a linear relationship between density and time. For example, if there is 50% too much light transmitted the paper should be exposed 50% shorter. This is the correction made in block 98 using the ratios of block 94.

However, this relationship is not exactly linear. Therefore a slope correction must be made. This correction is made in block 110. The slope correction used is an application of one of the constants adjusted in block 88 of FIG. 2A. The appropriate constant will be selected by determining which segment of FIG. 1B is applicable.

The operator of color printer system 10 may visually detect that a roll of film or a particular negative has an improper color. This may be due to such things as storing the film outside its temperature range for a long period of time. When this is detected, the operator may request appropriate color corrections using keyboard 18. In block 112 color printer system 10 will determine if any such requests have been made and if so make the requested corrections. If there is a manual override, as determined in diamond 90, execution will proceed directly to this block.

At this point, all of the appropriate corrections have been made to the print times. In block 114 microprocessor 14 opens dark shutter 38, activates the illumination source in lamphousing 50, activates paddles 32, 34 and 36 when appropriate, and closes dark shutter 38. Paper transport 56 is then activated by microprocessor 14. This causes the paper to be advanced and cut. The exposure times are displayed using display 16.

DETAILED DESCRIPTION OF SETUP PROCEDURE

Figure 3A:
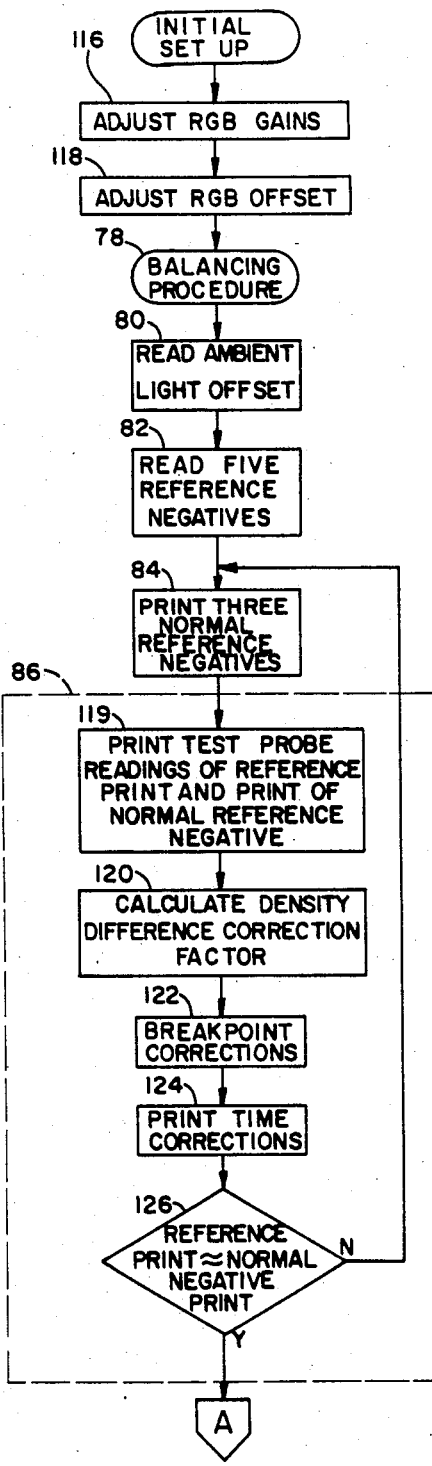
FIGS. 3A–B taken together form a flowchart of the detailed initial setup and balancing procedure used in the invention of FIG. 1A.
Figure 3B:
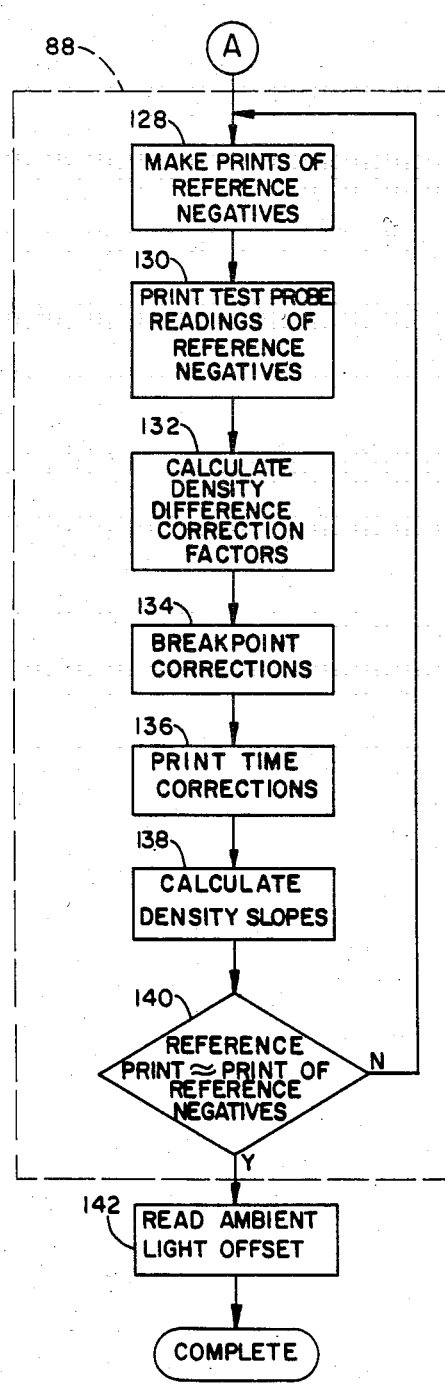

FIGS. 3A and 3B show a flow chart description of the initial setup procedure. This procedure is run when the machine is first installed and from time to time thereafter as desired. The balancing procedure described in FIG. 2A is a subset of this procedure and an expanded description of it is also shown in FIGS. 3A and 3B.

The first step in this initial setup procedure is an adjustment of the gains of operational amplifiers 40a–c of FIG. 1A. This step is shown in blocks 116 and 118. These operational amplifiers amplify the output of photocells 52a–c and apply this amplified output to A/D converter 44 by means of multiplexer 42. These gains are adjusted by means of three potentiometers. The primary objective of these adjustments is to prevent operation of A/D converter 44 from approaching its saturation range. Another objective is to achieve equal outputs from the three photocells as applied to A/D converter 44 by multiplexer 42. It is important to be approximately in the middle of the operating range of the A/D converter and to have equal red, green and blue outputs because this is the information upon which all control is based. To make the adjustment in block 116 the illumination source in lamphouse 50 is activated. Microprocessor 14 reads A/D converter 44 and displays these values to the operator on display 16. The operator will adjust the potentiometers until equal output at the optimum point of the operational range of A/D converter 44 is achieved.

Further adjustment of the photocell output is made in block 118. In this adjustment the illumination source in lamphouse 50 is deactivated and the offsets of the operational amplifiers are adjusted to assure a proper base lines. These base line adjustments are also made using three potentiometers. Once the system is thus assured of reliable readings of the negatives the balancing procedures can be begun. A detailed description of this procedure begins at block 78.

In block 80 the ambient light offset readings are taken. Since this balancing procedure is done in minimum light conditions, that is the lighting around the printer is turned off, this offset will be small. The amount of light leaking into the printer and striking the photocells will be stored in order to be subtracted from future photocell readings.

Block 82 shows a reading of the five reference negatives. These five reference negatives are the normal reference, the overexposed reference, the underexposed reference, the extremely overexposed, and the extremely underexposed. The overexposed and the underexposed negatives are incorrect by approximately two f-stops.

When the illumination source of lamphouse 50 of FIG. 1A is transmitted through negative 46, three readings are taken by photocells 52a–c, one for red, one for green and one for blue. These fifteen readings are used to determine reference points 60, 64, 68, 72 and 76 of the four segment slope of FIG. 1B. They are entered into the data base stored in RAM 24 for the appropriate setup.

Each different type of paper, size of paper and film speed requires its own group of data items called a setup. There are thus many different setups. Each setup contains approximately 52 data items. These 52 internal values include the initial values of reference print time and slope correction factors. When a print is to be made the operator requests, from cassette drive 28, the setup which is appropriate to the given requirements. The data items in this setup are then stored in RAM 24. These internal values are then used to obtain the proper prints for that printing session. During the balancing procedure these data items are modified. This procedure is performed as necessary for a given setup whenever it appears to the operator that prints made using that setup are not correct.

The format of a data base setup is shown in Table 1. The three readings taken for the normal reference in block 82 can be seen at data 44, data 45, and data 46. These data items are the A/D readings of reference negative obtained from red photocell 52a, green photocell 52b, and blue photocell 53c respectively. Similarly, the three readings for the overexposed reference negative can be seen at data 47, 48 and 49, and the three readings for the overexposed reference negative can be seen at data 50, 51 and 52.

Each of the readings represents a reference point on one of the three different four segment slopes, an example of which is represented in FIG. 1B. FIG. 1B shows a graph of the non-linear print time versus density slope. Each of the three primary colors will have its own independent graph.

Thus in block 82, microprocessor 14 uses algorithms contained in EPROM 23 to determine initial values for the reference points shown in FIG. 1B. After some adjustments, these reference points will determine the slopes which establish the adjusted print time signals necessary to correct underexposed and overexposed prints during production runs. It can be seen in FIG. 1B that the print time versus density is non-linear. It is therefore approximated using four segments. These segments are: segment 74 which is used to correct extremely underexposed negatives, segment 70 which is used to correct underexposed reference negatives, segment 66 which is used to correct overexposed reference negatives, and segment 62 which is used to correct extremely overexposed negatives. These segments are defined by the five reference points shown, each of which is obtained from one of the readings of each of the five reference negatives made in block 82. Reference point 68 in the center is the reference point associated with the standard normal reference negative. This is the negative which is defined to be correct. Reference point 72 is the reference point associated with the readings taken of the underexposed reference negative. Reference point 64 is the reference point associated with the overexposed reference negative. Reference point 76 is associated with the extremely underexposed negative, and reference point 60 is associated with the extremely overexposed negative. By breaking the graph of density versus time into four segments, it is possible to print negatives over a wide exposure range more accurately. Furthermore, it is possible to do this without requiring the expertise or judgement of the operator. Color printer system 10 can merely determine in which of the four regions the production negative falls and make the proper adjustments automatically.

In block 84 three prints of the normal reference negative are made. One of these prints will be used for comparison with the reference print below. These three prints are checked visually by the operator for consistency of density and color balance. Additionally, the operator will check the print times for each of the three colors, red, blue and green. The print times used will be displayed by the printer on display 16. Since this procedure is done under minimal light conditions, the three print times displayed should be within one A/D count of the print times stored in the data base. If either of these conditions are not met the operator must restart the balancing procedure.

The steps defined generally by dotted line 86, containing blocks 119, 120, 122, 124 and diamond 126 are an expanded view of block 86 of FIG. 2A. The first of these, block 119, shows the print density readings necessary for calculating the corrections which must be applied to the reference points and the print times in the data base in order to rebalance the set up. This is an iterative process. One of the reasons that an iterative process is used to cause these parameters to approach their correct values is the possibility that these corrections will overshoot. This is one of the reasons that a great deal of intuition and experienced judgement is required to manually correct color imbalance. To make the first set of print test probe readings the operator places the standard reference print under print test probe 59 and red, green and blue densities of the reference print are automatically communicated to microprocessor 14 by a means of multiplexer 42 and A/D converter 44. The same is done for one of the prints made from the normal reference negative in block 84.

The next step, shown in block 120, is the determination of a correction factor based upon the difference between the density readings of the reference print and one of the print made from the normal reference negative in block 84 for each of the three primary colors. In this step, microprocessor 14 will calculate the density difference between the two prints by subtracting the density of the print of the normal reference negative from the density of the reference print for each color. This multiplication factor can be expressed as the natural log base e raised to the power negative gamma times the delta density where gamma is the standard proportionality constant related to the density characteristics of the printing paper being exposed and the delta density is a proportionality constant related to the density difference between the two prints read by test probe 59. This density difference is related to the density of the reference print minus the density of the print made from the normal reference negative. EPROM 23 and RAM 24 contain algorithms and data which allow microprocessor 14 to make a first order approximation of this multiplication factor. Due to the feedback made possible by print test probe 59 color printer system 10 does not require knowledge of gamma or other paper characteristics. Any approximations or incorrect assumptions are automatically corrected by iterating blocks 84 and 86. If the densities are exactly equal, the multiplication factor will be unity.

These correction factors are applied to be reference point 68 of the print time versus density graph of each color in block 122. They are also applied to the print times of the normal reference negative for each color in the step shown in block 124. These values start at some approximation supplied to the user on a cassette. By performing the operations in block 124 these values are caused to become correct for the particular color printer, film, etc. The appropriate correction factors for the red, blue and green print times will be applied in this step.

The ultimate objective of the steps defined generally by dotted line 86 is to obtain a print from a normal reference negative which is identical to the reference print as determined by readings of print test probe 59. In diamond 126 the probe readings of block 119 are compared. If the difference is not within an acceptable range execution will return to block 84 in order to make a new print from a normal reference negative using the new reference point and print time. This process will be repeated as necessary causing successive adjustments until the prints are within tolerance.

Having learned how to make a correct print from a correct negative, the printer now learns how to make correct prints from underexposed and overexposed negatives. This process is depicted within dotted line 88 of FIG. 3B. Blocks 128, 130, 132, 134, 136, 138 and diamond 140 are an expanded representation of block 88 of FIG. 2A. The first step in this process is to make prints of the five negatives which were read in block 82. These are the normal reference, the overexposed reference, the underexposed reference, the extremely overexposed and the extremely underexposed. The printing of these negatives is shown in block 128.

In block 130 print test probe readings of each of these prints are made and stored in the data base in RAM 24. The objective is to adjust the reference points and print times of the four incorrectly exposed negatives in such a way as to produce prints of the four negatives which yield the same density readings as the print of the normal reference negative.

In block 132 the density difference correction factors are calculated in the same fashion as the density difference calculations in block 120. Three such correction factors are determined, one for each color. These three calculations are performed for each of the four negatives. In blocks 134 and 136 these correction factors are applied to reference points 60, 64, 68, 72 and 76 and to the print times for each of the four negatives. These new reference points are used to adjust other internal values.

Once the reference points have been adjusted the current or present values of density slope are replaced with adjusted values of density slope. The slope calculation involved is the standard m =delta y/delta x. For example, to determine the slope of segment 70 of FIG. 1B, the density coordinate of reference point 72 is subtracted from the density coordinate of reference point 68. The time coordinate of reference point 72 is then subtracted from the time coordinate of reference point 68. The former value is then divided by the later value. This process will be repeated for the red, the green and the blue reference points. The results are the adjusted print time versus density slopes. They will be stored at data 19, 20 and 21 of Table 1. The same procedure will be performed for segment 66, and the results will be stored at data 16, 17 and 18 of Table 1. This process is repeated for segments 62 and 74.

In diamond 140 a determination is made whether the densities of the prints made from the various underexposed and overexposed negatives which were made in block 128 are within the desired tolerance of the density of the print made from the normal reference negative. If they were not, a return to block 128 will be executed and the process will be repeated. This is continued until the densities are within tolerance.

The final step in the balancing procedure, block 142, is reading of the ambient light offset. This involves the same process as was described in block 80 above. At this point the lights are turned on and an ambient light offset is requested. This value is stored in memory and is used when the print cycle is executed. However, the operator may at the time of the execution of the print cycle elect to have another ambient light offset calculated in order to take into account the ambient light at the time of that print session, as often as necessary.

DETAILED DESCRIPTION OF THE PRINT CYCLE

Figure 3C:
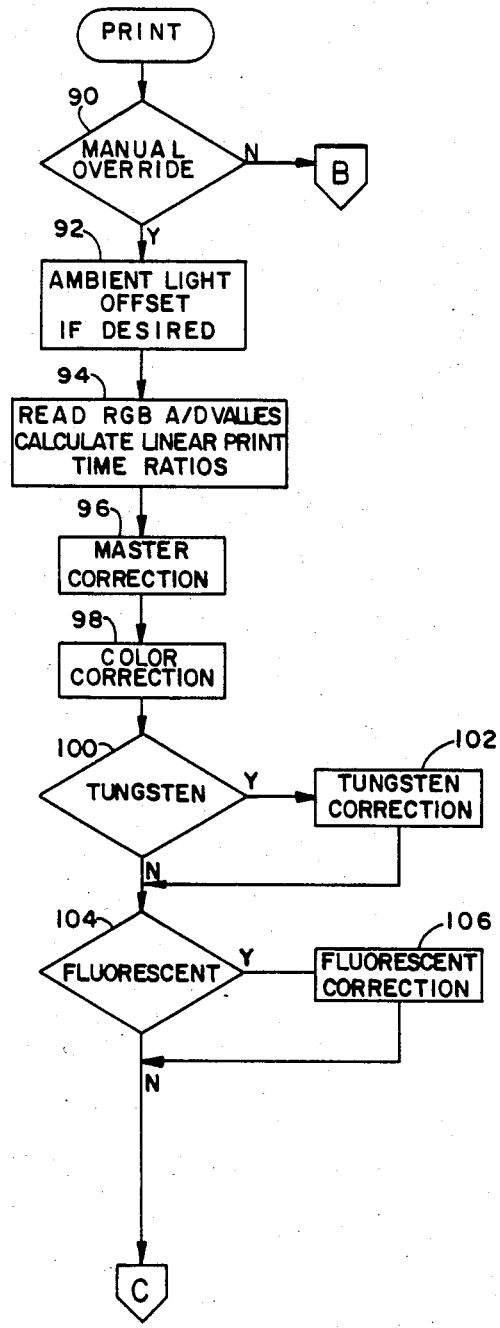
FIGS. 3C–D taken together form a flowchart of the detailed print cycle performed by the invention of FIG. 1A.
Figure 3D:
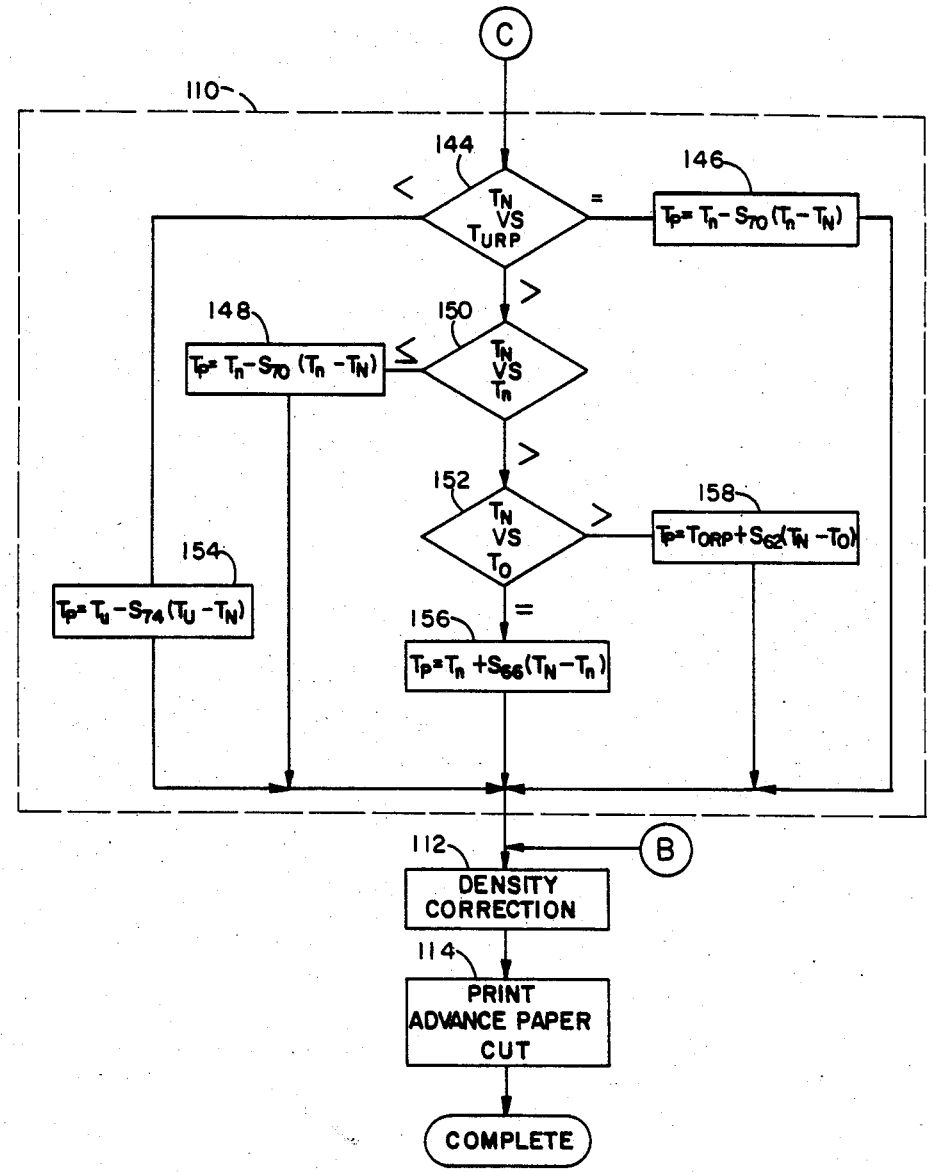

FIGS. 3C and 3D show a detailed description of the flow chart of the print cycle. There may be times when the operator will desire to make a print using judgement after visual examination of the negative. In such cases the operator may override all the correction factors to be described below. In diamond 90 a determination is made whether the operator has requested a manual override. If the answer is yes, execution proceeds to the density correction of block 112. Otherwise the operator may at this point elect to make an ambient light offset reading as seen in block 92. The operator will elect to make this ambient light offset reading whenever lighting conditions around the printer change. This reading is the same as was described in blocks 82 and 142. The amount of offset detected will be subtracted from the photocell readings in order to compensate for the ambient light.

In block 94 the illumination source in lamphousing 50 is activated and light is transmitted through negative 46. The amount of red, green and blue light transmitted is detected by photocells 52a, b, c respectively. The output of photocells 52a–c is amplified by operational amplifiers 40a–c and multiplexed by multiplexer 42. The output of multiplexer 42 is read by A/D converter 44 and microprocessor 14 makes readings of the output of A/D converter 44 by means of bus 12. Thus, these readings made by microprocessor 14 are related to the amount of red, green and blue light transmitted through the negative 46. EPROM 23 and RAM 24 contain algorithms and data which enable microprocessor 14 to make calculations based upon these A/D readings. These calculations involve developing ratios of the various amounts of light to each other. These ratios will be used to calculate the linear component of the print time signals and to determine whether a color predominance exists.

The linear print times are corrections of the reference print times contained in the data base which is in RAM 24. The print time signal for each color is inversely proportional to the light of that color which is transmitted by negative 46. For example, an overexposed negative will transmit less light and therefore will require a longer print time in order to print correctly. Thus, a ratio of the amount of red light transmitted by the production negative to the red light transmitted by the reference negative is multiplied by the normal print time of red in order to make this correction. However, in block 94 only the ratios are calculated, the application of these ratios to the print times may be suppressed later. Similar ratios are developed for green and blue light.

Block 96 shows the master correction factor. This correction factor takes into account everything in color printer system 10 from the light source through the measurement of a test print. The operator may request that a master correction factor be recalculated as necessary using keyboard 18. If some negatives are printed correctly and others are not, the operator will perform the balancing procedure as shown in FIG. 2A and FIG. 3A. However, if there is a systematic problem which appears in all setups, the operator will request a calculation of the master correction factor. In block 96, this master correction factor is retrieved from RAM 24 and applied to the current production print times.

In order to determine the master correction factor the density of a print of the normal reference negative and the density of a standard reference print are compared as in block 86. However when this correction factor is calculated from the density difference it is not applied to any of the internal values. It is stored in RAM 24 and applied to negatives falling in all of the segments of FIG. 1B regardless of which setup is used.

In block 98, color predominance is detected. Using microprocessor 14 and algorithms and data contained in EPROM 23 and RAM 24 color printer system 10 will determine whether the amount of red green and blue light transmitted by the production negative is approximately equal to the amount of each color transmitted by the normal reference negative. This determination is made by examining the light ratios calculated in block 94. If these ratios are within certain predetermined limits the standard "integration-to-gray" method will be used. Execution will proceed from color predominance detection block 98 to the slope correction block 110. If these ratios are within other predetermined limits, ratio will be made using a color correction of the print times to permit the print to have a proper color balance.

A predominance of yellow light may be due to the use of a tungsten filament lightbulb. If such a yellow predominance is detected the printer will inquire of the operator using display 16 whether a tungsten correction should be performed as represented in diamond 102. By visual inspection of negative 46 the operator can determine whether the predominance detected is due to tungsten or to some other factor. If the predominance is due to tungsten the operator will enter yes using keyboard 18 and a special tungsten correction will be executed in block 102. This correction involves the addition of the empirically determined fixed amount.

Similarly, a predominance of blue/green may be due to fluorescent light. As in the case of the yellow predominance for the tungsten correction, color printer system 10 will inquire of the operator in diamond 104 whether florescent correction should be made when a predominance of blue/green above an empirically determined value is detected. If the operator's response is yes, block 106 is executed. Again, a fixed empirically determined correction is added.

To the first approximation the relationship between the density and the print time is linear and the color correction of block 98 is adequate to the extent of this linearity. However, the relationship between density and time is not exactly linear. Therefore a non-linear or slope correction must be made. This correction is made in the steps defined generally by dotted line 110 of FIG. 3D. These steps are an expanded description of block 110 of FIG. 2A, the slope correction step. The appropriate correction will be selected by determining which segment of FIG. 1B is applicable.

Inside dotted line 110, the linear time of the test negative is compared against three other values of time. In diamond 144 it is compared against the time of the underexposed reference negative. In diamond 150 it is compared against the time of the normal reference negative, and in diamond 152 it is compared against the time of the overexposed reference.

In diamond 144, the time of the test negative ($T_n$) is compared against the time of the underexposed reference point ($T_{urp}$). If the time of the test negative is less than the time of the underexposed reference point, execution will proceed to block 154. This will be the case whenever a test negative falls in segment 74 of FIG. 1B. The slope correction for test negatives falling in this segment as shown in block 154 is:

$$T_p = T_u - S_{74}(T_u - T_n)$$

where $T_p$ is the print time which is being calculated, $T_u$ is the print time for the underexposed reference negative, $S_{74}$ is the slope which was calculated for segment 74 in block 138 of FIG. 3B. $T_n$ is the linear print time calculated thus far for the test negative.

If $T_n$ is equal to $T_{urp}$, the slope calculated for segment 70 of FIG. 1B is used. This is shown in block 146. This correction is:

$$T_p = T_n - S_{70}(T_n - T_u)$$

where $T_n$ is the print time for a normal reference negative and $S_{70}$ is the slope calculated in block 138 for segment 70. If the time of the test negative is greater than the time of the underexposed reference negative, then the test negative will fall into one of the other three segments. Diamonds 150 and 152 will be used to determine which.

In diamond 150, the time of a test negative is compared to the time of the normal negative. If the time of a test negative is less than or equal to the time of the normal reference negative block 148 will be executed. This is the region between a normal reference negative and an underexposed reference negative, that is, segment 70 of FIG. 1B. The calculation for the print time of negatives falling in this range is:

$$T_p = T_n - S_{70}(T_n - T_n).$$

This calculation is the same as the one performed in block 146.

In diamond 152, the time of the test negative is compared against the time of the overexposed reference negative. Using this test, the algorithm will determine whether the test negative falls into segment 62 or 66. If the time of the test negative is less than or equal to the time of the overexposed negative, the test negative falls in segment 68 and execution proceeds to block 156. This calculation is:

$$T_p = T_n + S_{66}(T_n - T_n)$$

where $S_{66}$ is the slope calculated in block 138 for negatives falling in region 66.

If the time of the test negative is greater than the time of the overexposed negative, execution will proceed to block 158. The correction calculated in this block is:

$$T_p = T_{ORP} - S_{62}(T_n - T_o)$$

where $T_o$ is the print time for the overexposed reference negative and $S_{62}$ is the slope correction factor segment 62.

Once the slope correction has been made, execution proceeds to block 112, the density correction. This is the block to which execution would immediately proceed if a manual override has been requested in diamond 90. The operator of color printer system 10 may visually detect that a roll of film or a particular negative has an improper amount of color. This may be due to such things as storing the film outside its temperature range for a long period of time. When this is detected, the operator may request appropriate color corrections using keyboard 18. In block 112, color printer system 10 will determine if any such requests have been made, and, if so, make the requested corrections.

At this point all of the appropriate corrections have been made to the print time. In block 114, microprocessor 14 opens dark shutter 38 in lamphouse 50, activates paddles 32, 34 and 36 as appropriate, closes dark shutter 38, and activates paper transport 56 which advances the paper and cuts it. The exposure times are displayed using display 16.

In color printer control system 10 the following components have been used for the operation and function as described and shown.

| Reference Number | Component |
| --- | --- |
| 14 | Z-80 |
| 19 | Z-80 CTC |
| 23 | 2732 |
| 24 | 6116 |
| 42 | 4051 |
| 44 | 7109 |
| 31 | 3X74LS374 |

While particular embodiments of the invention have been shown and described, this is not to be considered as necessarily limiting of the invention. It is understood that numerous changes may be made within the scope of the invention. For example, system 10 may control the making of prints from slides and black and white negatives. Lamphouse 50 may comprise any source of continuous or noncontinuous light. In addition, paddles 32, 34, 36 may be, for example, additive or subtractive.

The following is a listing for the firmware for EPROM 23. This listing carries out the operations set forth in FIGS. 2A-B and 3A-D and is expressed in Z80 assembly language.

What is claimed is:

1. A method for correcting for ambient light readings of the photocells used in reading light transmitted by a color negative where the ambient light includes lighting around the printer which comprises the steps of:
   (a) detecting by way of the photocells the amount of light of each primary color which strikes the printing paper when the lighting around the printer is turned off;
   (b) detecting the amount of light of each primary color which strikes the printing paper under ambient light conditions;
   (c) storing an ambient light correction related to the difference between the amounts of light in steps (a) and (b); and
   (d) applying the stored correction to future photocell readings taken under ambient light conditions.

2. A method for automatically adjusting the performing of setups of internal values and for controlling the color balance and the color density in making color prints from color negatives independent of the characteristics of the printing paper being exposed which comprises the steps of:
   (a) reading the light transmitted by each color negative;
   (b) transmitting light through each color negative and providing differing color print times in accordance with print time signals;
   (c) reading a normal reference print and prints made using the initial internal values and producing respective signals each related to the color densities; and
   (d) a system for comparing the signals from a normal reference print with the signals from prints actually made by the system using initial internal values to determine correction factors for adjusting internal values and dynamically replacing the initial internal values with the adjusted internal values, and
   (e) repeating steps a-d using the adjusted internal values.

3. The method of claim 2 in which step (e) includes repeating steps a-d until the difference in density between the normal reference print and prints made using the adjusted internal values is within any desired tolerance.

4. A method for automatically performing setups of internal values and for automatically self-correcting print time versus density slopes while self-correcting the control of color balance in making color prints from color negatives which comprises the steps of:
   (a) transmitting light through each reference color negative;
   (b) reading the light transmitted by each reference color negative and providing color print times in accordance with print time signals;
   (c) online reading by light sensing means of a reference print and producing a first set of signals related to the density of the reference print and separate online readings of prints made from normal, underexposed and overexposed reference negatives, each reference negative having corresponding internal values of print time signals and density slopes;
   (d) storing the first set of signals related to the density of the reference print;
   (e) producing a plurality of second sets of signals, each second set related to the respective color densities of each of the prints made from the normal, underexposed and overexposed reference negatives;
   (f) comparing the first set with the second set of each of the reference negatives;
   (g) automatically adjusting the print times and density slopes of the normal, underexposed and overexposed reference negatives in response to the comparisons substantially concurrently.

* * * * *